March 2, 1971 H. F. SNOW 3,566,438
SHUCKING OF BIVALVES
Filed Feb. 23, 1968 2 Sheets-Sheet 1

INVENTOR
HAROLD F. SNOW

BY
ATTORNEY

United States Patent Office 3,566,438
Patented Mar. 2, 1971

3,566,438
SHUCKING OF BIVALVES
Harold F. Snow, Scarborough, Maine, assignor to
Borden, Inc., New York, N.Y.
Filed Feb. 23, 1968, Ser. No. 707,666
Int. Cl. A22c 29/00
U.S. Cl. 17—74                                  6 Claims

ABSTRACT OF THE DISCLOSURE

This invention relates to the method of and apparatus for separating the meats of bivalves from the shells and comprises a cell, means for continuously moving said bivalves through said cell, means for heating said cell, and means for directing a stream of high velocity heated gas upwardly about said bivalves, means for crushing said shells, and means for displacing said shells from said meats.

BACKGROUND OF THE INVENTION

Heretofore, bivalves such as clams, scallops, oysters and the like have been shucked commercially by hand in a well-known manner, such as prying the shell open, inserting a knife to loosen the muscles and other tissues contained therein, and scraping the meat from the shells into one vat and discarding the unusable shells. Such processes have persistently been unsatisfactory, since they have proven costly in both time and labor, and the use of knives has resulted in undesirable multilation of the body of the meat of the bivalve. Moreover, this method has proven quite unsanitary in many instances, as manual operations often do. Accordingly, various references set forth in the prior art have attempted to solve the undesirability of manual shucking of bivalves by providing such methods as steam, heat, mechanical shock, and other combinations thereof to induce release of the meats of the bivalve from the shells which contain them. These processes have for the most part likewise proven unsatisfactory, since in the case of steam, a sufficient amount of the vaporous gas is difficult to control and regulate and as a result complete release of the meat from the bivalve is generally never effected, and manual scraping is still required to completely claim the meat contained therein. In the instance of other heating medias used to induce release of the meats from the shell, these likewise have proven unsatisfactory since it has been most difficult to concentrate a heat media about the shells for a sufficient length of time under controlled conditions to effect complete release along the points of the shell interior to which the muscle is attached. Moreover, where heat has been used, it has been found to be quite difficult to completely envelop the shell within this concentrated heat media to effect the desired release. There is also a conspicuous absence of control over the heat used to induce release, and this has resulted in the explosion of a considerable number of shells and premature cooking of the meats in many others.

SUMMARY OF THE INVENTION

The present invention overcomes the heretofore stated deficiencies in the prior art of mechanized shucking of bivalves and has as its primary object the provision of an apparatus to envelop the bivalve being treated in a concentrated heating media under controlled conditions which will induce complete release of the meat from the shell of the bivalve and by automated means destroy the shell and effect segregation of the meats therefrom.

Briefly stated, the present invention comprises a cell, means for continuously moving bivalves through said cell, means for heating said cell, and means for directing a stream of high velocity gas upwardly about said bivalves to completely envelop same in a concentrated heat media to induce release of the meats from the shell contained therein, means for crushing said shells, and means for displacing said shells from said meat.

BRIEF DESCRIPTION OF THE DRAWINGS

The various features of the apparatus of this invention will become apparent from the following detailed description set forth in connection with the accompanying drawings which relate to the preferred embodiment of the present invention and are given by way of illustration.

DETAILED DESCRIPTION OF THE INVENTION

Figure 1:
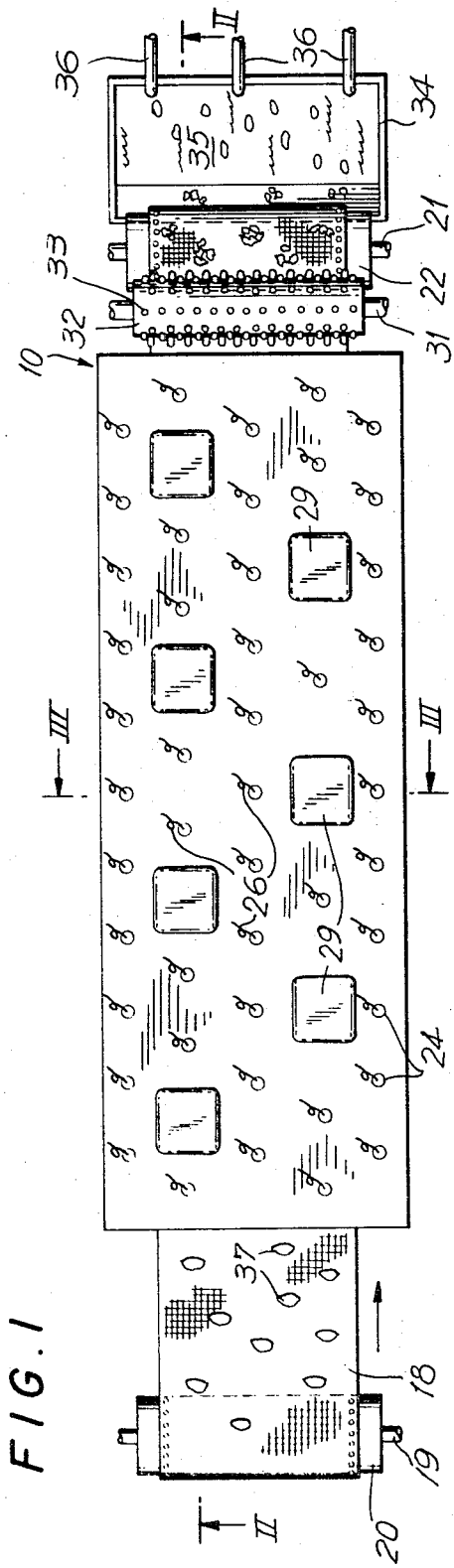
FIG. 1 is a top perspective view of the present invention.
Figure 2:
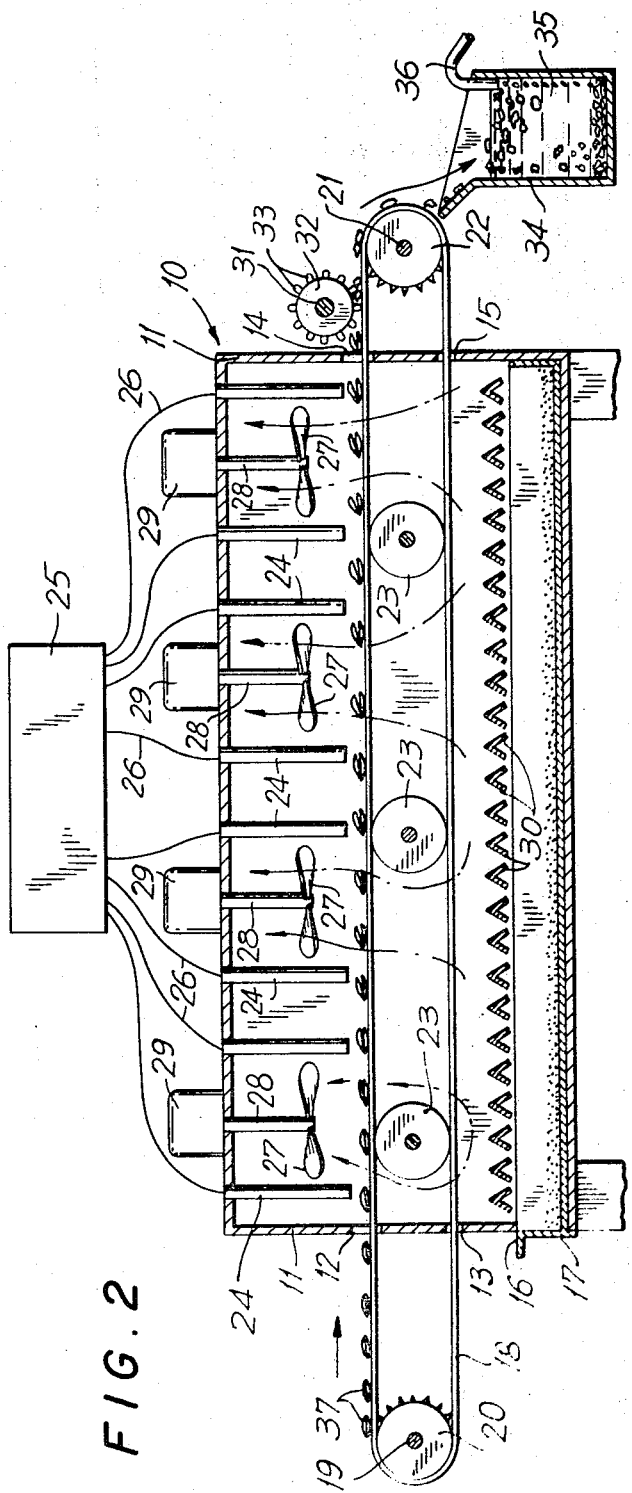
FIG. 2 is a cross-section side view taken through the center of the preferred embodiment of the present invention.
Figure 3:
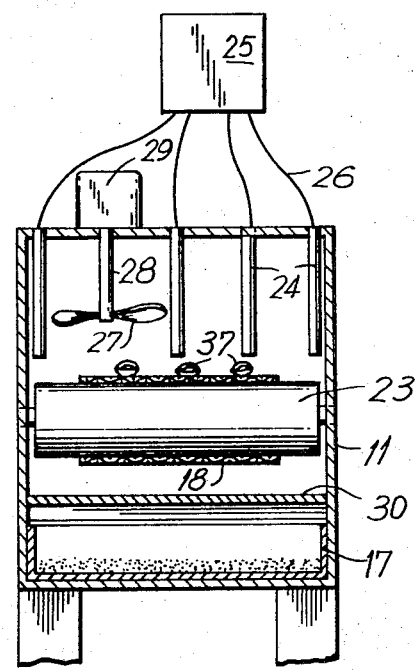
FIG. 3 is a transverse cross-sectional view taken along the line III—III of FIG. 1.
Figure 4:
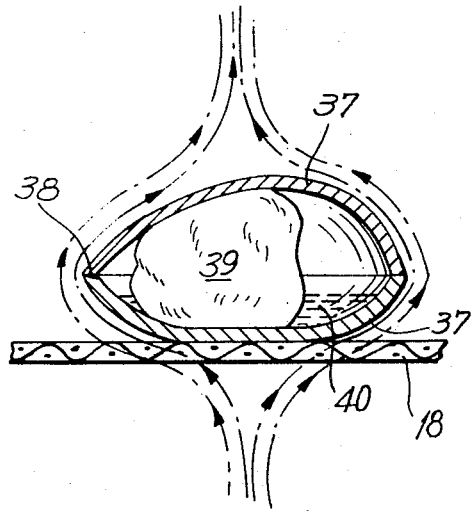
FIG. 4 is a detailed view of the envelopment of a bivalve by the heating media prior to opening.
Figure 5:
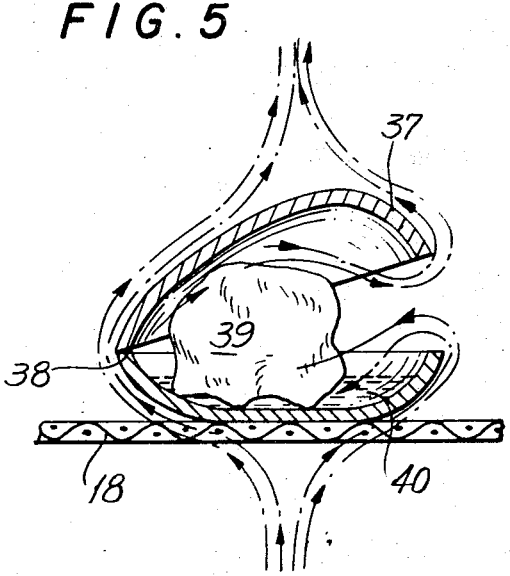
FIG. 5 is a detailed view of the bivalve after the muscle has been released the shell and the latter has swung open.

Referring to the preferred embodiment of the present invention, and more particularly to the view in FIG. 2 there is illustrated a cell 10 which is a rectangular compartment enclosed by top, bottom, end and side walls 11. The end walls 11 of the cells 10 include apertures 12, 13, 14 and 15 suitably spaced for purposes which will soon become apparent. An additional opening 16 is provided adjacent the bottom of the cell 10 which extends over the transverse dimension of the wall 11 and receives therein a shelf 17 for collecting particles which settle in the bottom of the cell. A foraminous conveyor belt 18 which in the preferred embodiment is of a known metallic material extends in a continuous manner through the apertures in the walls 11, as is best seen in FIG. 2, and is entrained about cylinders 20 and 22 having teeth thereon that engage the openings in the belt to drive same. The cylinders 20 and 22 are mounted on shafts 19 and 21 respectively which are rotatably driven by suitable driving means (not illustrated). Rollers 23 mounted within the cell 10 serve to assist in the movement of the foraminous conveyor belt 18 over its path of travel. Within the cell 10 and depending from the top wall thereof are a plurality of electric coils or heating rods 24 which impart heat to the interior and draw current from power source 25 by way of conductors 26. The temperature of the cell 10 is preferably to be maintained within a range of from 600° to 1200° F. Accordingly, it should be noted that since such temperatures approach the melting point of the metallic foraminous conveyor belt 18, tensile forces on the belt should be kept to a minimum. Thus, it has been found advantageous to drive both shafts 19 and 21 to reduce stresses in the belt, as well as to provide the rollers 23 to support the belt against gravitational forces. A fan blade 27 mounted on rotating shaft 28 also depends from the top wall of the cell 10 and is driven by motor means 29, which may be of a conventional type, such as an electric motor. The blade 27 rotates in a direction to draw the flow of the air in the interior of the cell in an upward direction in order to maintain a constant stream of heat on the bottom face of the valves riding on the foraminous conveyor belt 18.

Mounted on shaft 31 and adjacent the aperture 14 on the outside of the cell 10 is a cylinder 32 having projections 33 on the periphery thereof which is adapted to rotate in a close proximity to the conveyor 18 so as to crush the bivalves which ride on the conveyor belt out of the cell 10. The shells are broken into sections less than two inches in dimension in any direction, and the muscle and broken shell portions are conveyed to the edge of cylinder 22 and dropped by gravity into vat 34. The vat 34 contains an aqueous saline solution of sufficient intensity to float the meats which are dropped therein, but which allows the broken shell portions which are of a heavier density to settle to the bottom. A bubbler system, including a conduit 36, supplies gas under pressure to the solution 35 to agitate same and thereby assist in separation of the shells from the meats. The meats are skimmed off the top in a conventional manner and sent elsewhere for further processing. Periodically, the broken shell portions are cleaned from the bottom of the vat 34, and disposed of.

Mounted within the cell 10 and extending across the transverse dimension thereof are a plurality of inverted V-bars 30, which reside above the shelf 17. It has been found that broken shell portions frequently drop through the foraminous conveyor belt to the bottom of the cell 10. Previously, such broken shells would turn to a chalky powder due to the intense heat generated within the cell 10 by the heating coils 24 and the blades 27 would circulate the powder and contaminate the various meats passed along the conveyor belt during processing. The inverted V-bars 30 break the circulation of the heat in the lower portion of the cell, as well as shielding the foreign matter which passes therethrough from the intense heat of the upper portion of the cell.

OPERATION

The scientific principle involved in the present process is of significant interest and will be explained in detail at this time. It has been found that when a bivalve comprising a pair of complementary shells 37 which encloses a muscle or meat portion 39 is subjected to a concentrated envelope of heat, the bond of the muscle to the inner face of the shell releases at the points of attachment thereof and the meat portion and shells are separated. The shells 37 of the bivalve are hinged together by a ligament portion 38, which in a natural position biases the valve open, and it is the muscle 39 which draws the shells together. The release of the muscle from the shells causes the latter to spring open and shucking of the clam is thereby easily carried out. A high degree of control must be maintained over the heat imparted to the shell to prevent cooking of the meat inside the shell, since the liquid content 40 present in the shell would have the effect of vaporizing and pressure cooking the meat 39. It has been found that the temperature most desirable to effect or induce complete release of the muscle from the shell is within a range of from approximately 600° to 1200° F., the optimum working range being approximately 1000°. Moreover, the bivalve should be subjected to the enveloping of the heat stream thereabout over a period of from about 30 seconds to 120 seconds. The release of a sea clam bivalve has proven optimal at a temperature of approximately 1000° F. over an exposure time of 60 seconds at a relatively high velocity of heating media. It It has been found that by enveloping the bivalve in this heated stream and effecting release of the muscle with the consequent springing open of the shells has tended to prevent cooking of the meat within the interior of the shell, since the liquid 40 passes out during the heat treatment in the form of a vapor, thereby cooling the meat and obviating premature cooking.

Accordingly, various bivalves, such as clams, scallops, and oysters are randomly spaced on the foraminous conveyor belt 18, subjected to the upward stream of heat generated in the cell 10 which induces the muscle 39 to completely release from the bivalve 37, as is evidenced by the springing open of the bivalve and thereafter crushing the bivalve and separating the meats in the fashion described hereinabove. Care should be taken to prevent damage to the meat during the crushing of the shell. The crushed shells then pass into the flotation media, settle to the bottom, and the meats float where they are later skimmed off. The aqueous saline media should be of a non-toxic solutional material such as alcohols and salts. It is preferably a bland solution of sufficient solidity to assure the flotation of the various densities of the meats, depending on the particular bivalve being shucked.

Although one embodiment of the present invention has been herein illustrated and described, it will be evident to those skilled in the art that various modifications may be incorporated into the details of production without departing from the principles herein set forth.

What is claimed is:

1. Apparatus for heating and crushing bivalves and for separating crushed shells from the meats of the bivalves comprising a cell; means for continuously moving the bivalves through said cell disposed above the bottom of the cell to provide space between said moving means and the bottom of said cell; a plurality of elongated heating means depending from the top of said cell and arranged in spaced order within said cell; means disposed between said heating means in the upper portion of said cell for directing a stream of high velocity heated gas upwardly about the bivalves whereby release of the meats from the shells is facilitated; means for crushing the shells; and means for separating crushed shells from the meats.

2. The apparatus according to claim 1 wherein said directing means comprises a plurality of rotating blades depending from the ceiling of said cell which direct the stream of gas upwardly at all times.

3. The apparatus according to claim 1 wherein said crushing means includes a rotating cylinder having projections extending outwardly thereof for engaging the said shells on said moving means whereby destruction of the shell is effected.

4. The apparatus according to claim 1 wherein said displacement means includes a flotation media of specific gravity sufficient to float the meats while allowing the shells to sink.

5. Apparatus of claim 1 including bars disposed in the lower portion of said cell and below said moving means for breaking circulation of the heat in said cell and for shielding matter, including broken shell portions of the bivalves disposed below said bars, from the intense heat generated in the upper portion of said cell.

6. Apparatus of claim 5 wherein said bars are V-shaped with their apexes pointing upwardly.

References Cited

UNITED STATES PATENTS

| | | | |
|---|---|---|---|
| 2,047,688 | 7/1936 | Jenkins | 17—48 |
| 2,337,188 | 12/1943 | Geldermans | 17—48 |
| 2,669,068 | 2/1954 | Wambreuze | 263—8 |
| 3,203,034 | 8/1965 | Matzer et al. | 17—74 |

FOREIGN PATENTS

| | | | |
|---|---|---|---|
| 551,674 | 3/1943 | Great Britain | 17—74 |

LUCIE H. LAUDENSLAGER, Primary Examiner

U.S. Cl. X.R.

17—48; 263—8